(12) United States Patent
Abrink

(10) Patent No.: US 9,152,664 B2
(45) Date of Patent: Oct. 6, 2015

(54) PARTITION MANAGEMENT SYSTEM

(75) Inventor: Ulf Abrink, Balsta (SE)

(73) Assignee: VIDEO B HOLDINGS LIMITED (VG)

( * ) Notice: Subject to any disclaimer, the term of this patent is extended or adjusted under 35 U.S.C. 154(b) by 0 days.

(21) Appl. No.: 12/099,624

(22) Filed: Apr. 8, 2008

(65) Prior Publication Data

US 2008/0256029 A1 Oct. 16, 2008

(30) Foreign Application Priority Data

Apr. 13, 2007 (AU) ................................ 2007901965

(51) Int. Cl.
G06F 17/30 (2006.01)

(52) U.S. Cl.
CPC ................................ G06F 17/30339 (2013.01)

(58) Field of Classification Search
CPC ....................... G06F 17/3053; G06F 17/30454
USPC .......................................................... 707/796
See application file for complete search history.

(56) References Cited

U.S. PATENT DOCUMENTS

| | | | |
|---|---|---|---|
| 5,546,107 A | 8/1996 | Deretsky | |
| 5,734,893 A * | 3/1998 | Li et al. | 707/694 |
| 6,075,193 A | 6/2000 | Aoki et al. | |
| 6,233,590 B1 * | 5/2001 | Shaw et al. | 715/201 |
| 6,349,297 B1 * | 2/2002 | Shaw et al. | 1/1 |
| 6,349,310 B1 * | 2/2002 | Klein et al. | 707/703 |
| 6,772,163 B1 * | 8/2004 | Sinclair et al. | 1/1 |
| 7,080,072 B1 * | 7/2006 | Sinclair | 1/1 |
| 7,113,957 B1 * | 9/2006 | Cohen et al. | 707/714 |
| 7,406,499 B2 * | 7/2008 | Singh et al. | 709/205 |
| 7,890,541 B2 * | 2/2011 | Teng et al. | 707/802 |
| 8,074,038 B2 * | 12/2011 | Lionetti et al. | 711/162 |
| 8,255,917 B2 * | 8/2012 | Herington | 718/104 |
| 8,285,966 B2 * | 10/2012 | Shah et al. | 711/173 |
| 8,452,991 B2 * | 5/2013 | Geissler et al. | 713/300 |
| 2002/0087510 A1 | 7/2002 | Weinberg | |
| 2002/0137217 A1 | 9/2002 | Rowe | |
| 2004/0048671 A1 | 3/2004 | Rowe | |
| 2004/0122845 A1 | 6/2004 | Lohman et al. | |
| 2004/0167922 A1 * | 8/2004 | Yanase et al. | 707/102 |
| 2004/0180721 A1 | 9/2004 | Rowe | |
| 2004/0199530 A1 * | 10/2004 | Avadhanam et al. | 707/100 |
| 2004/0267782 A1 | 12/2004 | Nakano et al. | |
| 2005/0015436 A1 * | 1/2005 | Singh et al. | 709/203 |
| 2005/0137973 A1 * | 6/2005 | Hoffman et al. | 705/40 |
| 2005/0138204 A1 | 6/2005 | Iyer | |
| 2005/0251524 A1 | 11/2005 | Shukla | |
| 2005/0282638 A1 | 12/2005 | Rowe | |
| 2006/0098009 A1 | 5/2006 | Zuniga | |
| 2007/0016558 A1 * | 1/2007 | Bestgen et al. | 707/3 |

(Continued)

FOREIGN PATENT DOCUMENTS

| | | |
|---|---|---|
| EP | 1143662 A2 | 10/2001 |
| JP | 2001252401 A | 9/2001 |

(Continued)

*Primary Examiner* — Jean M Corrielus
(74) *Attorney, Agent, or Firm* — Cantor Colburn LLP

(57) ABSTRACT

A partition management system is disclosed for a database comprising at least one database table. The system comprises a partition controller arranged to automatically create at least one table partition in advance so that at least one table partition is available prior to when the table partition is required by the database. A corresponding method is also disclosed.

32 Claims, 3 Drawing Sheets

(56) References Cited

U.S. PATENT DOCUMENTS

| | | |
|---|---|---|
| 2007/0027860 A1* | 2/2007 | Bestgen et al. .................... 707/5 |
| 2007/0032288 A1 | 2/2007 | Nelson |
| 2007/0067366 A1* | 3/2007 | Landis .......................... 707/205 |
| 2007/0198591 A1* | 8/2007 | Teng et al. ..................... 707/200 |
| 2007/0271211 A1* | 11/2007 | Butcher et al. .................... 707/1 |
| 2008/0046400 A1 | 2/2008 | Shi et al. |
| 2008/0059407 A1* | 3/2008 | Barsness et al. .................. 707/2 |
| 2008/0082602 A1* | 4/2008 | Morikawa ..................... 709/203 |
| 2008/0228783 A1* | 9/2008 | Moffat .......................... 707/100 |

FOREIGN PATENT DOCUMENTS

| | | |
|---|---|---|
| JP | 2004152051 A1 | 5/2004 |
| KR | 20030063620 A1 | 7/2003 |
| KR | 20050012864 A | 2/2005 |
| WO | 0205116 A2 | 1/2002 |
| WO | 0215054 A2 | 2/2002 |
| WO | 0225471 A2 | 3/2002 |
| WO | 0239742 A2 | 5/2002 |
| WO | 2007008413 A1 | 1/2007 |

\* cited by examiner

PARTITION MANAGEMENT SYSTEM

CROSS-REFERENCE TO RELATED APPLICATIONS

This application claims priority to Australian Provisional Patent Application No. 2007901965, having an international filing date of Apr. 13, 2007, entitled "A Partition Management System," which is hereby incorporated by reference herein in its entirety.

FIELD OF THE INVENTION

The present invention relates to a partition management system for a database.

BACKGROUND OF THE INVENTION

Modern databases are capable of holding significant amounts of data which is often structured into several tables. In order to maintain satisfactory manageability, performance and availability of data in the database, tables having a significant amount of data are generally divided into several partitions with each partition holding data falling within a predefined unique data range. Failure to regularly partition database tables can be problematic. For example, a back office database (BODB) of a client-server based gaming system typically receives several terabytes of data each week and, accordingly, if regular partitioning of database tables does not occur, the performance of the database will quickly deteriorate.

However, partitioning of databases is currently carried out manually by database administrators, typically once per hour for a client-server based gaming system. This imposes a significant workload on the database administrators.

SUMMARY OF THE INVENTION

In accordance with an aspect of the present invention, there is provided a partition management system for a database comprising at least one database table, said system comprising:

a partition controller arranged to automatically create at least one table partition in advance so that at least one table partition is available prior to when the table partition is required by the database.

In one arrangement, the partition controller is arranged to automatically create advance table partitions according to predefined partition creation criteria at a scheduled time, such as once per day.

The predefined partition creation criteria may comprise a margin parameter indicative of how far in advance to create table partitions or how many table partitions to create in advance.

In one embodiment, each created table partition includes an associated data range, which may be a time range, governing data which is receivable in the table partition. With this embodiment, the partition creation criteria may comprise an interval parameter indicative of the time range to be covered by a created partition.

The system may also be arranged to create a default partition intended to hold any data falling outside the data ranges defined for currently existing partitions.

In one embodiment, the partition controller is also arranged to automatically delete table partitions according to predefined partition deletion criteria.

The predefined partition deletion criteria may comprise a retention interval parameter indicative of how long to retain a table partition prior to deletion.

The system may be arranged such that the partition creation criteria and/or the partition deletion criteria are user modifiable. For this purpose, the partition creation criteria and/or the partition deletion criteria may be embodied in a control table accessible and modifiable by a user.

In one embodiment, the system comprises at least one partition procedure which is executed by the partition controller so as to carry out automatic advance creation of table partitions using the partition creation criteria and and/or automatic deletion of table partitions using the partition deletion criteria. The at least one partition procedure may comprise a partition creation procedure and a partition deletion procedure which may be separately executable.

In one arrangement, the system may be arranged to determine whether all existing partitions are likely to be filled before the partition creation procedure is next invoked.

The system may be arranged to invoke the partition creation procedure prior to the next scheduled partition creation procedure if the determination indicates that all existing partitions are likely to be filled before the next scheduled partition creation procedure.

Alternatively, the system may be arranged to modify partition creation criteria so that when the next scheduled partition creation procedure is invoked additional partitions are created if the determination indicates that all existing partitions are likely to be filled before the next scheduled partition creation procedure.

The determination may be an estimate of the time until all existing partitions will be filled based on the time that the last partition was created and the number of remaining empty partitions.

In a further arrangement, the system may be arranged to monitor database performance and to modify partition creation criteria when reduced database performance is identified so that when the next scheduled partition creation procedure is invoked additional partitions are created.

The partition controller may be implemented in software, or may be implemented in hardware and software.

In accordance with a second aspect of the present invention, there is provided a database management system for a database comprising at least one database table, the database management system comprising a partition management system comprising:

a partition controller arranged to automatically create table partitions in advance so that adequate table partitions are available to receive data when required.

In accordance with a third aspect of the present invention, there is provided a method of partitioning a database comprising at least one database table, the method comprising automatically creating at least one table partition in advance so that at least one table partition is available prior to when the table partition is required by the database.

In accordance with a fourth aspect of the present invention, there is provided a computer program arranged when loaded into a computer to instruct the computer to operate in accordance with a partition management system comprising:

a partition controller arranged to automatically create at least one table partition in advance so that at least one table partition is available prior to when the table partition is required by the database.

In accordance with a fifth aspect of the present invention, there is provided a computer readable medium having computer readable program code embodied therein for causing a computer to operate in accordance with a partition management system comprising:

a partition controller arranged to automatically create at least one table partition in advance so that at least one table partition is available prior to when the table partition is required by the database.

BRIEF DESCRIPTION OF THE DRAWINGS

Certain embodiments of the present invention will now be described, by way of example only, with reference to the accompanying drawings, in which.

DESCRIPTION OF CERTAIN EMBODIMENTS
OF THE INVENTION

Figure 1:
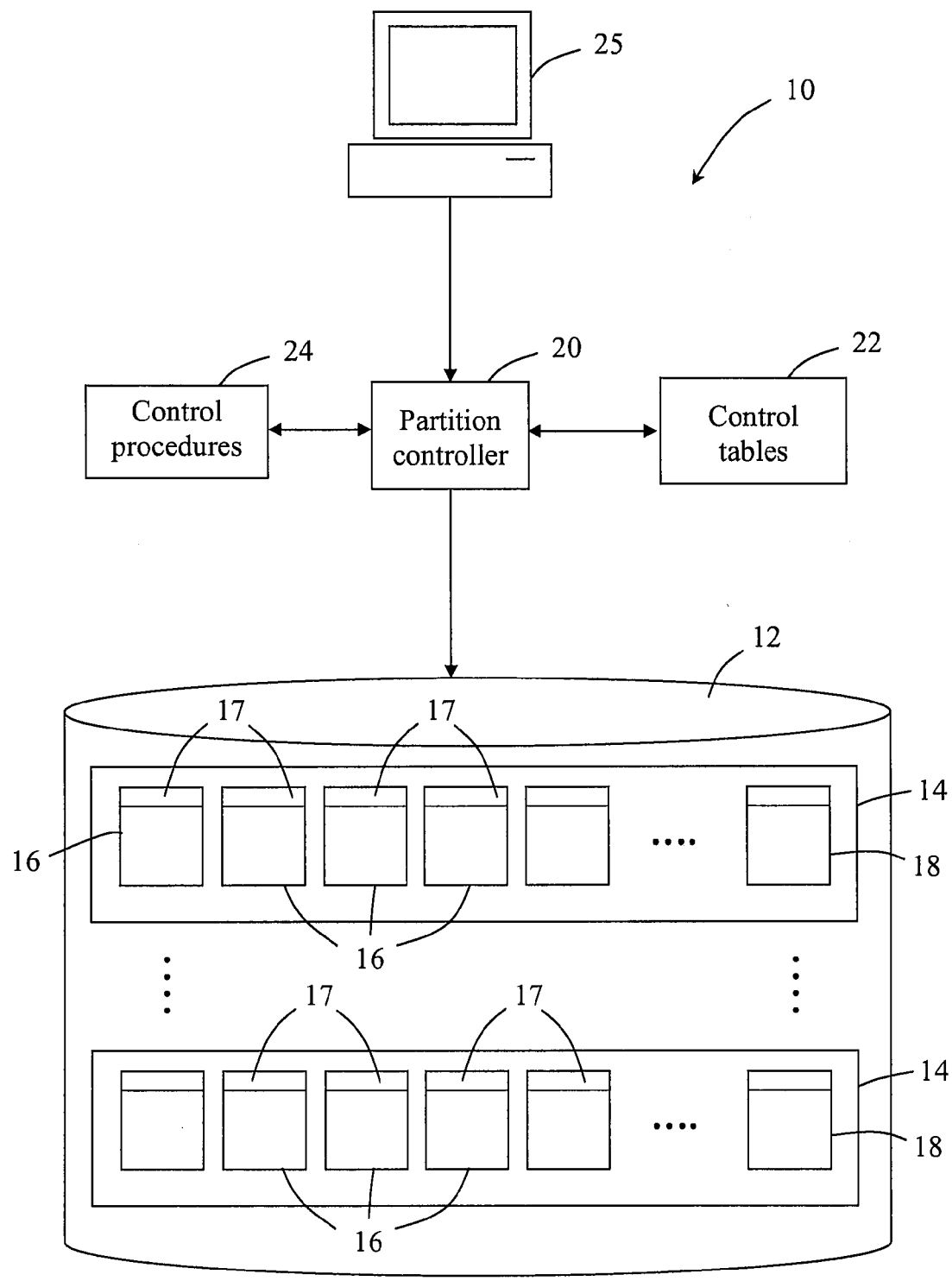
FIG. 1 is a schematic diagram of a partition management system in accordance with an embodiment of the present invention.
Figure 2:
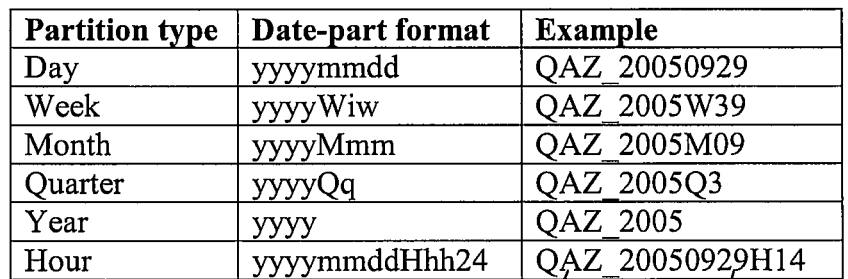
FIG. 2 shows example naming formats for partitions created by the partition management system shown in FIG. 1.
Figure 3:
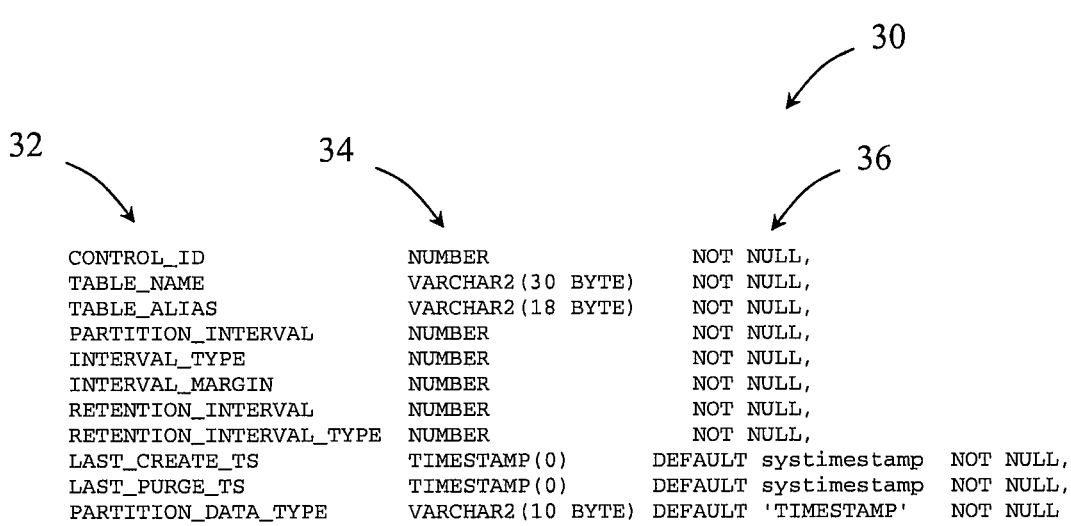
FIG. 3 shows an example table layout of a control table of the partition management system shown in FIG. 1.

Referring to FIGS. 1 to 3 of the drawings, there is shown a partition management system 10 for managing data in a database 12 having one or more tables 14 separated into table partitions 16.

In the present example, the database 12 is a back office database (BODB) of a client-server based gaming system, although it will be understood that other types of database are envisaged.

The partition management system 10 is arranged to automatically create table partitions 16 in advance so that delays in creating a table partition 16 are avoided and partitions 16 are always available for receiving data when required, and database administrators are relieved of tedious and time consuming table partition creation tasks.

The partition management system 10 is arranged to create one or more desired table partitions 16 in advance at regular scheduled time intervals, such as once per day, once per hour, and so on.

Each table partition 16 may have an associated predefined data range 17 such that only data having values falling within the predefined range 17 will be allocated to the partition 16.

For example, in the present embodiment each partition 16 has a predetermined range corresponding to a time period which may be an hour, a day, a week, a month, a quarter, or a year, and only data created at a time falling within the respective time period associated with the partition is allocated to the partition 16. This is referred to as a 'partition key'.

Each table 14 may also include a default partition 18 which is intended to hold any data falling outside the ranges 17 defined for the currently existing partitions 16.

In this example, each partition 16 is allocated a name based on the range 17 associated with the partition 16. Any suitable format is envisaged. For example, as shown in a name format table 26 in FIG. 2, each partition name may comprise a table name portion 27 which corresponds to the name of the table 14 with which the partition 16 is associated, and a time range portion 28.

It will be understood from FIG. 2 that the format of the time range portion 28 of the partition name is dependent on whether the time range covered by the partition is to be in units of a day, week, month, quarter, year or hour.

The partition management system 10 comprises a partition controller 20 which is arranged to control and coordinate creation in advance of new partitions 16 and deletion of old partitions 16. For this purpose, control tables 22 are provided to define parameters governing creation and deletion of partitions 16, and control procedures 24 are provided to carry out partition creation and partition deletion operations under control of the partition controller 20 using the parameters in the control tables 22.

In the present embodiment, the partition controller 20 and the partition creation and deletion procedures are implemented as software applications and, as such, appropriate components would be included in the partition management system 10 in order to enable execution of the applications, such as a processor and associated memory. However, it will be understood that as an alternative, the partition controller 20 and the functions of the partition creation and partition deletion routines may be implemented at least partly in hardware.

In one embodiment, the functions of the partition controller and/or the partition creation and partition deletion procedures are incorporated into functionality of a database management system (DBMS), which may be based on SQL.

An example control table format 30 which illustrates example parameters 32 defined in a control table 22 is shown in FIG. 3.

Each parameter 32 is definable by an authorized user such as a database administrator, represented in FIG. 1 by computing device 25, and has an associated parameter type 34 and a user entered value 36.

In this example, the parameters 32 are:

| | |
|---|---|
| CONTROL_ID: | This is a sequence number unique to the table associated with the control table. |
| TABLE_NAME: | The name of the partitioned table. |
| TABLE_ALIAS: | This is used to create a partition name in the format <table_alias>_yyyymmdd. TABLE_ALIAS is a shortened version of TABLE_NAME and is the same as TABLE_NAME if TABLE_ALIAS fits in 21 bytes. |
| PARTITION_INTERVAL: | Defines the period length (in units of INTERVAL_TYPE) for a partition, that is, the time range covered by the partitioned table. |
| INTERVAL_TYPE: | Defines units for PARTITION_INTERVAL and INTERVAL_MARGIN; selected from 1 = day, 2 = week, 3 = month, 4 = quarter, 5 = year, 6 = hour. |
| INTERVAL_MARGIN: | Defines how far in advance a partition should be created, in INTERVAL_TYPE units. |
| RETENTION_INTERVAL: | Defines how long (in RETENTION_INTERVAL_TYPE units) to retain old partitions before they are deleted. |
| RETENTION_INTERVAL_TYPE: | Defines units for RETENTION_INTERVAL; selected from 0 = forever, 1 = day, 2 = week, 3 = month, 4 = quarter, 5 = year, 6 = hour. |
| LAST_CREATE_TS: | Defines when last partition was created for logging purposes. |
| LAST_PURGE_TS: | Defines when last partition was purged for logging purposes. |
| PARTITION_DATA_TYPE: | TIMESTAMP or DATE. |

Figure 4:
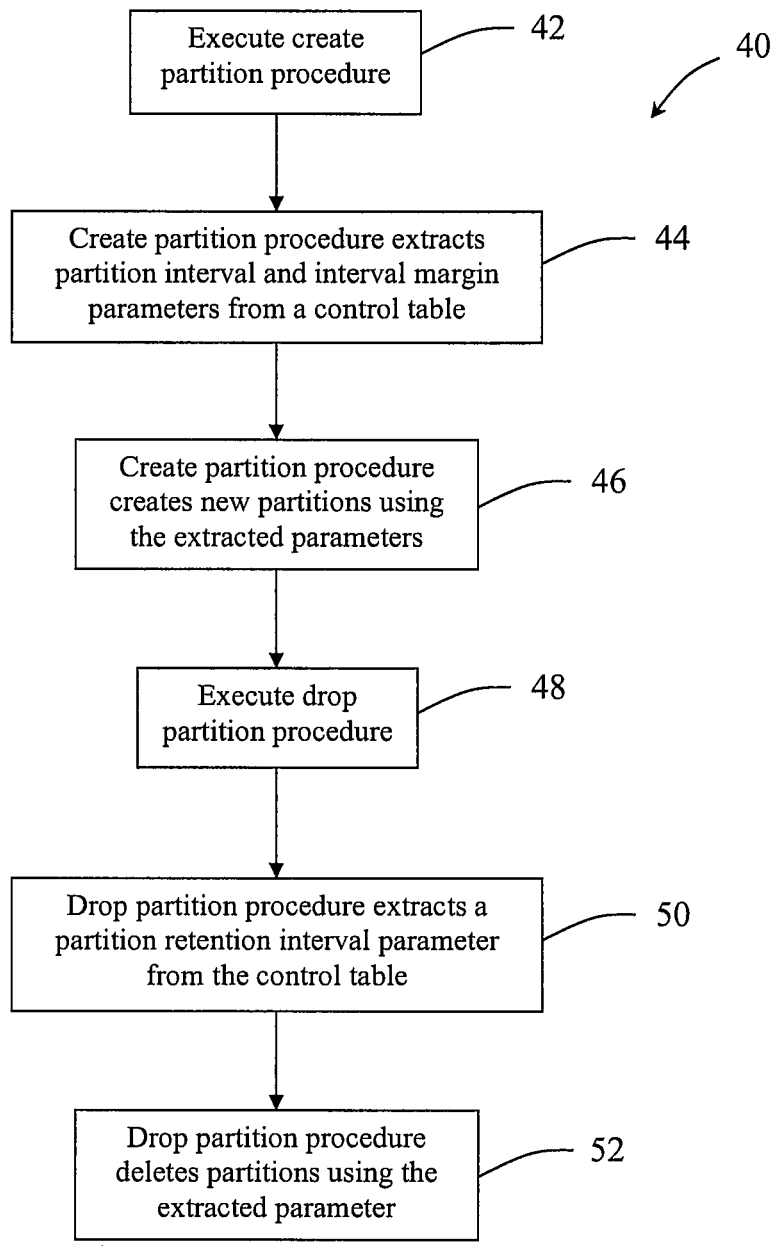
FIG. 4 is a flow diagram illustrating a method of managing partitions in a database in accordance with an embodiment of the present invention.

At scheduled times, the partition controller 20 extracts parameters from the or each control table 22 and executes control procedures 24 using the extracted parameters, in this example a create partition procedure and a delete partition procedure. A flow diagram 40 illustrating steps 42 to 50 of an example partition creation method is shown in FIG. 4.

For example, in the present example wherein the database 12 is a back office database of a client-server based gaming system, 3 tables 14 may be present in the database 12 corresponding to a game data session log table, a session events and transaction table, and an entitlement data table.

The control table 22 associated with the game data session log table may include a PARTITION_INTERVAL parameter equal to 1 day, an INTERVAL_TYPE parameter equal to 1 (signifying units of 1 day), an INTERVAL_MARGIN parameter equal to 6 days, a RETENTION_INTERVAL_TYPE parameter equal to 1 (signifying units of 1 day), and a RETENTION_INTERVAL parameter equal to 45 days. When the create partition procedure is executed, based on these parameters the partition controller 20 will cause partition tables 22 each covering a duration of 1 day to be created such that partitions exist covering the following 6 days. When the delete partition procedure is executed, based on these parameters the partition controller 20 will cause any partition tables 22 older than 45 days to be deleted.

The control table 22 associated with the session events and transaction table may include a PARTITION_INTERVAL parameter equal to 1 hour, an INTERVAL_TYPE parameter equal to 6 (signifying units of 1 hour), an INTERVAL_MARGIN parameter equal to 120 hours, a RETENTION_INTERVAL_TYPE parameter equal to 1 (signifying units of 1 day), and a RETENTION_INTERVAL parameter equal to 45 days. When the create partition procedure is executed, based on these parameters the partition controller 20 will cause partition tables 22 each covering a duration of 1 hour to be created such that partitions exist covering the following 120 hours (5 days). When the delete partition procedure is executed, based on these parameters the partition controller 20 will cause any partition tables 22 older than 45 days to be deleted.

The control table 22 associated with the entitlement data table may include a PARTITION_INTERVAL parameter equal to 1 hour, an INTERVAL_TYPE parameter equal to 6 (signifying units of 1 hour), an INTERVAL_MARGIN parameter equal to 120 hours, a RETENTION_INTERVAL_TYPE parameter equal to 3 (signifying units of 1 month), and a RETENTION_INTERVAL parameter equal to 3 months. When the create partition procedure is executed, based on these parameters the partition controller 20 will cause partition tables 22 each covering a duration of 1 hour to be created such that partitions exist covering the following 120 hours (5 days). When the delete partition procedure is executed, based on these parameters the partition controller 20 will cause any partition tables 22 older than 3 months to be deleted.

Since with this example all data received at the database 12 during a particular time range associated with a partition 16 is stored in the partition, there is a possibility that the partition will contain too much data for optimum efficiency at the end of the time range. In order to avoid this circumstance, the partition controller may be arranged to automatically modify the parameters in the control table 22 so that partitions 16 of smaller time duration are created at the next scheduled partition creation operation.

It will also be appreciated that since separate create partition and delete partition procedures exist, it is possible to individually execute the create partition procedure or the delete partition procedure should it be necessary. However, it will be understood that this is not essential and the functions of the create partition and delete partition procedures may as an alternative be carried out by a single executable procedure.

It will be appreciated that by entering appropriate values for the parameters 32 into the control tables 22, any suitable partition creation and deletion scheme may be defined.

While the above embodiment is described in relation to partitions having time based ranges so that data is stored in a partition if the time of storage falls within the time range associated with the partition, other arrangements are possible.

For example, the created partitions may not have an associated time range and may instead receive data based on other non-time related data values.

Alternatively, the created partitions may have a defined capacity and may each receive data based only on a sequence number assigned to each table partition 16 so that table partitions are filled consecutively according to sequence number.

In this example, the partition controller 20 may also be arranged to monitor partition usage and to modify the number of created advance partitions depending on how quickly the existing partitions are being filled. For example, the control table 22 may include a status parameter indicative of the estimated time until all existing partitions 16 (not including the default partition 18) have been filled. The status parameter may be computed by the partition controller 20 based on the time that the last partition was created and the number of remaining unfilled partitions. Based on the status parameter, the partition controller 20 may be arranged to determine how many advance partitions are required to be created in a subsequent partition creation operation.

Execution of partition creation and/or partition deletion procedures may be scheduled to occur periodically, such as once per day or once per hour. In addition, the partition controller may be arranged to carry out ad-hoc execution of the partition creation and/or partition deletion procedures based on the status parameter and/or based on other criteria. For example, if the status parameter indicates that the existing partitions are filling up at a faster rate than expected, the partition creation and/or partition deletion procedures may be executed early, that is, prior to the scheduled time.

Modifications and variations as would be apparent to a skilled addressee are deemed to be within the scope of the present invention.

Where in the foregoing description reference has been made to integers having known equivalents, then those equivalents are hereby incorporated herein as if individually set forth.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A partition management system for a database comprising:
　　at least one database table comprising a plurality of first partitions of said database table, each of said first partitions having an assigned consecutive sequence number indicative of consecutive parameters of data to be allocated to respective first partition; and a partition controller formed from electrical circuitry and configured to generate a status parameter being indicative of the estimated time until all existing first partitions have been filled, to update the status parameter based at least in part on monitoring a rate of filling said first partitions;

to automatically create a number of second partitions in said database table, said second partitions operable to allocate a different amount of data than said first table partitions, to determine the number of said second partitions to be created based on
  i) the time that the last of said first partitions was created,
  ii) the number of said first partitions that are yet to be filled, and
  iii) a current value of said status parameter to assign to each of said second partitions a consecutive sequence number indicative of consecutive parameters of data to be allocated to respective second partition, and to make a sequence number of a given second partition available prior to when said sequence number of the given second partition is required by the database to allocate data corresponding to said sequence number of the given second partition.

2. A partition management system as claimed in claim 1, wherein said first partitions created based on a plurality of parameters, the plurality comprises defined partition creation criteria.

3. A partition management system as claimed in claim 2, and wherein the partition creation criteria are modifiable by a user.

4. A partition management system as claimed in claim 2, and wherein the partition creation criteria includes a time schedule defining when partitions are created.

5. A partition management system as claimed in claim 4, wherein the time schedule is once per day.

6. A partition management system as claimed in claim 2, and wherein the partition controller is further configured to modify partition creation criteria so that said second partition is created if all existing table partitions are likely filled before the next scheduled time.

7. A partition management system as claimed in claim 2, and wherein the partition creation criteria comprise data indicative of how far in advance to create partitions.

8. A partition management system as claimed in claim 2, and wherein the partition creation criteria comprise data indicative of how many partitions to create in advance.

9. A partition management system as claimed in claim 2, and wherein the partition creation criteria comprise an interval parameter indicative of a time range to cover by a said second partition.

10. A partition management system as claimed in claim 2, and wherein the partition controller is further configured to monitor database performance and to modify the partition creation criteria when reduced database performance is identified so that additional partitions are created.

11. A partition management system as claimed in claim 1, wherein said created second partition includes an associated data range governing data receivable in the second partition.

12. A partition management system as claimed in claim 11, wherein the data range comprises a time range.

13. A partition management system as claimed in claim 1, wherein the partition controller is further configured to create a default third partition to hold any data falling outside the data ranges defined for currently existing partitions.

14. A partition management system as claimed in claim 1, wherein the partition controller is further configured to automatically delete partitions according to defined partition deletion criteria.

15. A partition management system as claimed in claim 14, wherein the defined partition deletion criteria comprise a retention interval parameter indicative of how long to retain a partition prior to deletion.

16. A partition management system as claimed in claim 14, wherein the partition deletion criteria are modifiable by a user.

17. A method of partitioning a database using a partition management system having a partition controller formed from electrical circuitry and at least one database table comprising a plurality of first partitions of said database table, each of said first partitions having an assigned consecutive sequence number indicative of consecutive parameters of data to be allocated to respective first partition, the method comprising:

generating, by the partition controller, a status parameter being indicative of the estimated time until all existing first partitions have been filled;

updating, by the partition controller, the status parameter based at least in part on monitoring a rate of filing said first partitions;

automatically creating by the partition controller a number of second partitions operable to allocate a different amount of data than said first table partitions wherein the number of said second partitions to be created is determined by the partition controller based on the time that the last of said first partitions was created, the number of said first partitions that are yet to be filled and a current value of said status parameter;

assigning to each of said second partitions in said database table a consecutive sequence number indicative of consecutive parameters of data to be allocated to respective second partition; and making a sequence number of a given second partition available prior to when said sequence number of the given second partition is required by the database to allocate data corresponding to said sequence number of the given second partition.

18. A method as claimed in claim 17, and wherein said first partitions created based on a plurality of parameters, the plurality comprising defined partition creation criteria.

19. A method as claimed in claim 18, and further comprising facilitating said modification of the partition creation criteria by a user.

20. A method as claimed in claim 18, and further comprising creating said at least one second partition according to a time schedule.

21. A method as claimed in claim 20, and further comprising creating said at least one second partition once per day.

22. A method as claimed in claim 18, and further comprising modifying partition creation criteria so that said at least one second partition is created if all existing partitions are likely filled before the next scheduled time.

23. A method as claimed in claim 18, and wherein the partition creation criteria comprises data indicative of how far in advance to create partitions.

24. A method as claimed in claim 18, and wherein the partition creation criteria comprises data indicative of how many partitions to create in advance.

25. A method as claimed in claim 18, and wherein the partition creation criteria comprises an interval parameter indicative of a time range to cover by a said second partition.

26. A method as claimed in claim 18, and further comprising monitoring database performance and modifying partition creation criteria when reduced database performance is identified so that additional partitions are created.

27. A method as claimed in claim 18, and wherein each created partition includes an associated data range governing data which is receivable in the partition.

28. A method as claimed in claim 27, and wherein the data range comprises a time range.

29. A method as claimed in claim 17, and further comprising creating a default partition to hold any data falling outside the data ranges defined for currently existing partitions.

30. A method as claimed in claim 17, and further comprising automatically deleting partitions according to defined partition deletion criteria.

31. A method as claimed in claim 30, and wherein the defined partition deletion criteria comprises a retention interval parameter indicative of how long to retain a partition prior to deletion.

32. A method as claimed in claim 30, and further comprising facilitating said modification of the partition deletion criteria by a user.

\* \* \* \* \*